United States Patent
Thubert et al.

(10) Patent No.: US 9,258,208 B2
(45) Date of Patent: Feb. 9, 2016

(54) MULTIPLE PATH AVAILABILITY BETWEEN WALKABLE CLUSTERS

(71) Applicant: Cisco Technology, Inc., San Jose, CA (US)

(72) Inventors: Pascal Thubert, La Colle sur Loup (FR); Jonathan Martin, Menton (FR); Patrick Wetterwald, Mouans Sartoux (FR)

(73) Assignee: Cisco Technology, Inc., San Jose, CA (US)

( * ) Notice: Subject to any disclaimer, the term of this patent is extended or adjusted under 35 U.S.C. 154(b) by 64 days.

(21) Appl. No.: 13/768,453

(22) Filed: Feb. 15, 2013

(65) Prior Publication Data
US 2014/0122741 A1    May 1, 2014

Related U.S. Application Data (60) Provisional application No. 61/720,051, filed on Oct. 30, 2012.

(51) Int. Cl.
*H04L 12/715* (2013.01)
*H04L 12/751* (2013.01)
*H04L 12/703* (2013.01)

(52) U.S. Cl.
CPC .............. *H04L 45/04* (2013.01); *H04L 45/46* (2013.01); *H04L 45/02* (2013.01); *H04L 45/28* (2013.01)

(58) Field of Classification Search
CPC .............. H04L 41/08; H04L 41/082–41/085; H04L 41/0803–41/089; H04L 41/12; H04L 45/04; H04L 45/46
USPC ........................................................ 709/239
See application file for complete search history.

(56) References Cited

U.S. PATENT DOCUMENTS 5,452,292 A * 9/1995 Okanoue ................. H04L 45/04
                                                       370/403
6,643,287 B1 * 11/2003 Callon et al. .................. 370/392
(Continued)

FOREIGN PATENT DOCUMENTS

| EP | 2466832 A1 | 6/2012 |
| WO | 2010022793 A1 | 3/2010 |

OTHER PUBLICATIONS

Tanenbaum, Andrew S. And David J. Wetherall. Computer Networks. 5th ed. Boston: Prentice Hall, 2010. pp. 362-392 (included as pdf pp. 1-14).*

(Continued)

*Primary Examiner* — Jerry Dennison
*Assistant Examiner* — Albert Chiou
(74) *Attorney, Agent, or Firm* — Leon R. Turkevich (57) ABSTRACT

In one embodiment, a method comprises creating, in a computing network, a hierarchal routing topology for reaching a destination, the hierarchal routing topology comprising a single parent supernode providing reachability to the destination, and a plurality of child supernodes, each child supernode comprising one or more exit network devices each providing a corresponding link to the parent supernode; receiving, in one of the child supernodes, a data packet for delivery to the destination; causing the data packet to traverse along any available data link in the one child supernode independent of any routing topology established by network devices in the one child supernode, until the data packet reaches one of the exit network devices; and the one exit network device forwarding the data packet to the parent supernode, via the corresponding link, for delivery to the destination.

20 Claims, 6 Drawing Sheets

(56) References Cited

U.S. PATENT DOCUMENTS

| | | | |
|---|---|---|---|
| 6,724,734 B1* | 4/2004 | Shabtay et al. | 370/254 |
| 6,870,846 B2* | 3/2005 | Cain | 370/392 |
| 7,190,678 B2 | 3/2007 | Thubert et al. | |
| 7,203,175 B2 | 4/2007 | Thubert et al. | |
| 7,366,111 B2 | 4/2008 | Thubert et al. | |
| 7,428,221 B2 | 9/2008 | Thubert et al. | |
| 7,519,733 B1 | 4/2009 | Thubert et al. | |
| 7,593,377 B2 | 9/2009 | Thubert et al. | |
| 7,656,857 B2 | 2/2010 | Thubert et al. | |
| 7,668,119 B2 | 2/2010 | Thubert et al. | |
| 7,693,064 B2 | 4/2010 | Thubert et al. | |
| 7,860,025 B2 | 12/2010 | Thubert et al. | |
| 8,085,686 B2 | 12/2011 | Thubert et al. | |
| 8,102,775 B2 | 1/2012 | Thubert | |
| 8,111,684 B2 | 2/2012 | Thubert et al. | |
| 8,228,954 B2 | 7/2012 | Thubert et al. | |
| 8,254,349 B2* | 8/2012 | Horn | H04L 29/06 370/321 |
| 2002/0176370 A1* | 11/2002 | Ohba et al. | 370/252 |
| 2005/0055573 A1 | 3/2005 | Smith | |
| 2008/0209070 A1* | 8/2008 | Horn | 709/238 |
| 2010/0215051 A1 | 8/2010 | Solis et al. | |
| 2012/0233326 A1 | 9/2012 | Shaffer et al. | |

OTHER PUBLICATIONS

Tanenbaum, Andrew S. and David J. Wetherall. Computer Networks. 5th ed. Boston: Prentice Hall, 2010. pp. 332-348 (included as pdf pp. 1-8).*

Kim, Daejoong, and N. F. Maxemchuk. "A comparison of flooding and random routing in mobile ad hoc network." 3rd New York Metro Area Networking Workshop (Sep. 2003).*

Atlas, Ed., "U-turn Alternates for IP/LDP Local Protection", [online], Nov. 2004, [retrieved on Apr. 11, 2011]. Retrieved from the Internet: <URL: http://tools.ietf.org/html/draft-atlas-ip-local-protect-uturn-00.txt>, pp. 1-29.

Winter, Ed., "RPL: Routing Protocol for Low Power and Lossy Networks", [online], Aug. 3, 2009, [retrieved on Apr. 11, 2011]. Retrieved from the Internet: ,URL: http://tools.ietf.org/draft-ietf-roll-rpl-00>, pp. 1-69.

Vasseur, "Terminology in Low power and Lossy Networks", Sep. 14, 2011, Network Working Group, Internet Draft, <draft-ietf-roll-terminology-06.txt, pp. 1-8.

Nelakuditi et al., "Fast Local Rerouting for Handling Transient Link Failures", [online], 2007 [retrieved on Oct. 5, 2010]. Retrieved from the Internet: <URL: http://rubinet.ece.ucdavis.edu/paper/2007/ton07-fir.pdf >.

Atlas, Ed., "Basic Specification for IP Fast Reroute: Loop-Free Alternates", Sep. 2008, Network Working Group, Request for Comments: 5286, pp. 1-31.

Winter, Ed., "RPL: IPv6 Routing Protocol for Low-Power and Lossy Networks", Mar. 2012, Internet Engineering Task Force, Request for Comments: 6550, pp. 1-157.

Lohman, "Wireless Introduction" [online], Mar. 1, 2010, [retrieved on Jan. 29, 2013]. Retrieved from the Internet: <URL: http://www.hcf-files.com/webasyst/published/DD/html/scripts/getfolderfile_zoho.php?DL_ID=MTA5NQ%3D%3D&ID=72a7beb0a6eeba6aaf06ef19e00ce258&DB_KEY=V0VCRkIMRVM%3D>, pp. 1-11.

Lampin et al., "On MP2P Routing Through Siblings in RPL" [online], 2009 [retrieved on Jul. 5, 2013]. Retrieved from the Internet: <URL: http://ietf.thomasclausen.org/roll/roll-dbarthel.ppt>, 7 pages.

Pister, Ed., "Industrial Routing Requirements in Low-Power and Lossy Networks", Oct. 2009, Internet Engineering Task Force, Request for Comments: 5673, pp. 1-27.

* cited by examiner

MULTIPLE PATH AVAILABILITY BETWEEN WALKABLE CLUSTERS

This application claims priority to Provisional U.S. Application No. 61/720,051, filed Oct. 30, 2012.

TECHNICAL FIELD

The present disclosure generally relates to providing alternate paths to a destination in a computing network, such as an Internet Protocol (IP) network.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

Existing routing protocols assume recalculation of routes can be performed in response to a detected failure (e.g., loss of a link or a connecting network node); however, recalculation of routes requires computation time that likely results in a loss of data traffic. One attempt to accelerate responding to a detected failure includes "Loop Free Alternates" (LFA), where a router can respond to losing a next hop router in a path to a destination node by identifying a feasible successor for reaching the destination node, as long as the feasible successor does not create a loop by sending the packet back to the router. The IETF Draft by Atlas, entitled "U-turn Alternates for IP/LDP Local Protection (draft-atlas-ip-local-protect-uturn-00.txt)", illustrates in FIG. 3 of the IETF Draft a network topology where LFA solutions can be provided for the network nodes N2, N4, and R3 to forward a data packet to the destination node D in the event of a failed link, however, LFA cannot provide any solutions for any of the network nodes N3, S, P, R1, or R2. The IETF Draft by Atlas proposed a "U-turn protocol" to reverse a link; however, the U-turn protocol cannot provide any solution for the nodes P, R1, or R2 of FIG. 3 in the event of a link failure.

Another proposed routing protocol, referred to as "Fast Local Rerouting for Handling Transient Link Failures" (FIR) requires a complete recalculation of routes in response to a link failure, and hence recalculation of routes requires computation time that likely results in a loss of data traffic.

Another proposed routing protocol is described in RFC 6550, entitled "RPL: IPv6 Routing Protocol for Low-Power and Lossy Networks" (hereinafter "RPL").

BRIEF DESCRIPTION OF THE DRAWINGS

Reference is made to the attached drawings, wherein elements having the same reference character designations represent like elements throughout and wherein.

DESCRIPTION OF EXAMPLE EMBODIMENTS

Overview

In one embodiment, a method comprises creating, in a computing network, a hierarchal routing topology for reaching a destination, the hierarchal routing topology comprising a single parent supernode providing reachability to the destination, and a plurality of child supernodes, each child supernode comprising one or more exit network devices each providing a corresponding link to the parent supernode; receiving, in one of the child supernodes, a data packet for delivery to the destination; causing the data packet to traverse along any available data link in the one child supernode independent of any routing topology established by network devices in the one child supernode, until the data packet reaches one of the exit network devices; and the one exit network device forwarding the data packet to the parent supernode, via the corresponding link, for delivery to the destination.

In another embodiment, an apparatus comprises a processor circuit and a network interface circuit. The processor circuit is configured for creating, in a computing network, a hierarchal routing topology for reaching a destination, the hierarchal routing topology comprising a single parent supernode providing reachability to the destination, and a plurality of child supernodes, each child supernode comprising one or more exit network devices each providing a corresponding link to the parent supernode; the processor circuit further is configured for causing a data packet, received in one of the child supernodes and destined for a destination, to traverse along any available data link in the one child supernode independent of any routing topology established by network devices in the one child supernode, until the data packet reaches one of the exit network devices; and the network interface circuit is configured for causing the one exit network device to forward the data packet to the parent supernode, via the corresponding link, for delivery to the destination.

DETAILED DESCRIPTION

Figure 1:
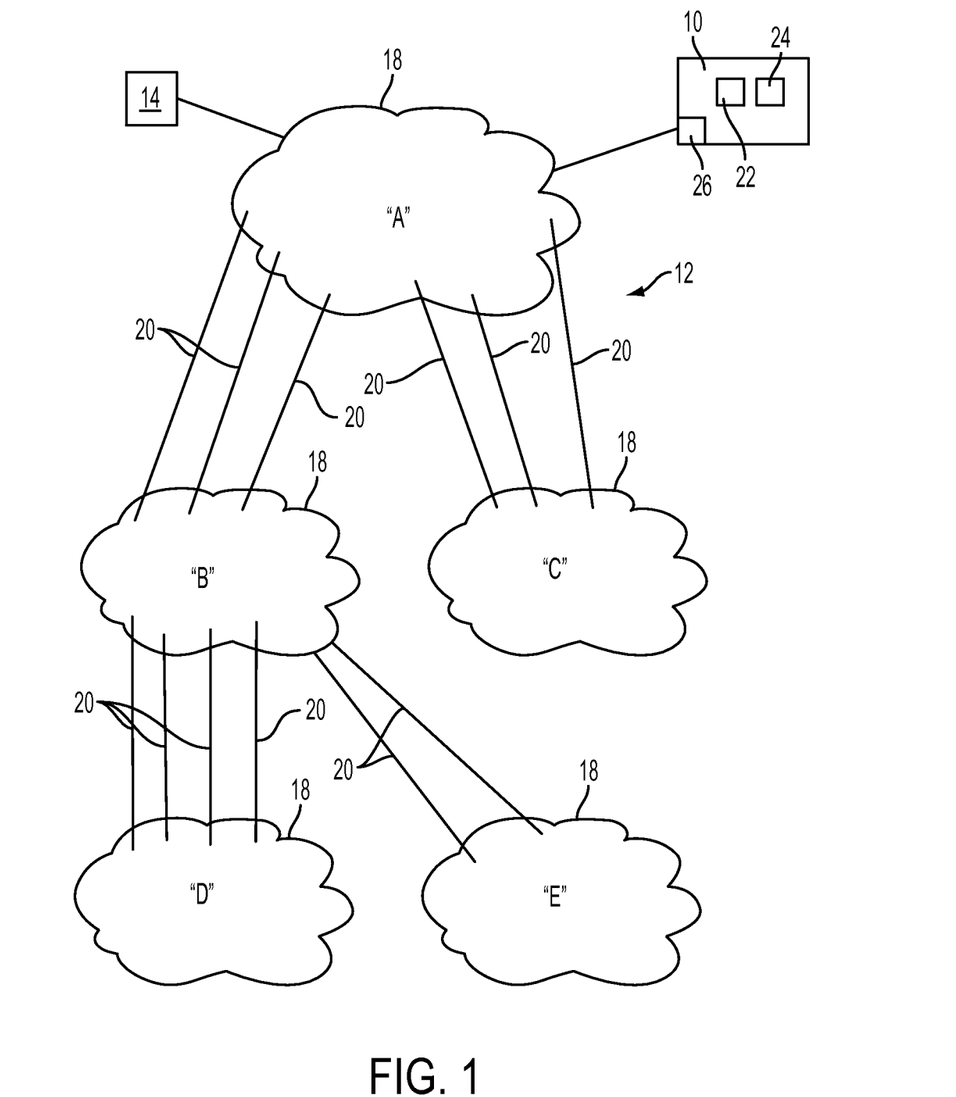
FIG. 1 illustrates an example routing topology comprising a hierarchy of supernodes including child supernodes each having multiple links for reaching a parent supernode for reaching a destination network node, according to an example embodiment.

Particular embodiments enable an apparatus (10 of FIG. 1) to create, within a computing network, a hierarchal routing topology (12 of FIG. 1) for reaching a destination 14 (e.g., a destination host node, a wired or wireless access router providing access to a wide area network, etc.). The hierarchal routing topology is based on network devices (16 of FIG. 2) arranging themselves into multiple "mini clusters" 18, also referred to as "supernodes" 18, that are interconnected via inter-cluster data links 20. As illustrated in FIG. 1, the hierarchal routing topology 12 includes a single parent supernode "A" 18 and a plurality of child supernodes "B", "C", "D", and "E" 18.

The apparatus 10 and/or each network device 16 can be implemented as one or more computing devices each comprising one or more processor circuits 22, one or more non-transitory tangible storage medium (or media) (e.g., memory circuit) 24, and one or more network interface circuits 26.

The apparatus 10 can be configured as a centralized server, a network device such as a wired or wireless router device (e.g., a mobile router), a wired or wireless host network device, etc. Hence, in one embodiment, the apparatus 10 can centrally create the hierarchal routing topology 12 for all the network devices 16. In another embodiment, the apparatus 10 can be implemented as one of the network devices 16, where the network devices 16 can independently cooperate amongst each other (i.e., negotiate) in order to form the hierarchal routing topology 12 in a distributed manner.

Figure 3:
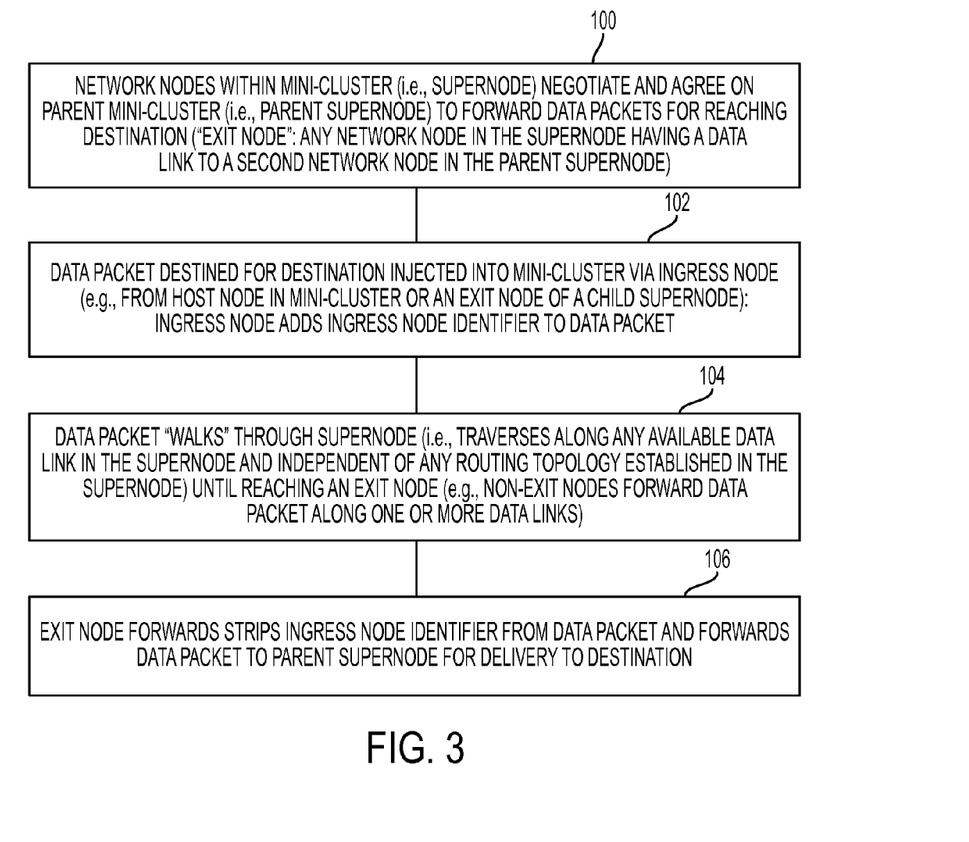
FIG. 3 illustrates an example method of establishing the multiple path availability among walkable clusters in the routing hierarchy of FIGS. 1-2, according to an example embodiment.

In one embodiment, the apparatus 10 can create in operation 100 of FIG. 3 the hierarchal routing topology 12 for reaching the destination 14 based on causing the network devices 16 to establish mini clusters 18, where each network device 16 can be a member of one and only one mini cluster 18. As described below, the formation of the mini clusters 18 and the inter-cluster data links 20 are independent of any routing protocol that may exist in the computing system, hence the formation of the mini clusters 18 and the inter-cluster data links 20 can be performed either before or after formation of a network according to existing routing protocols.

Figure 2:
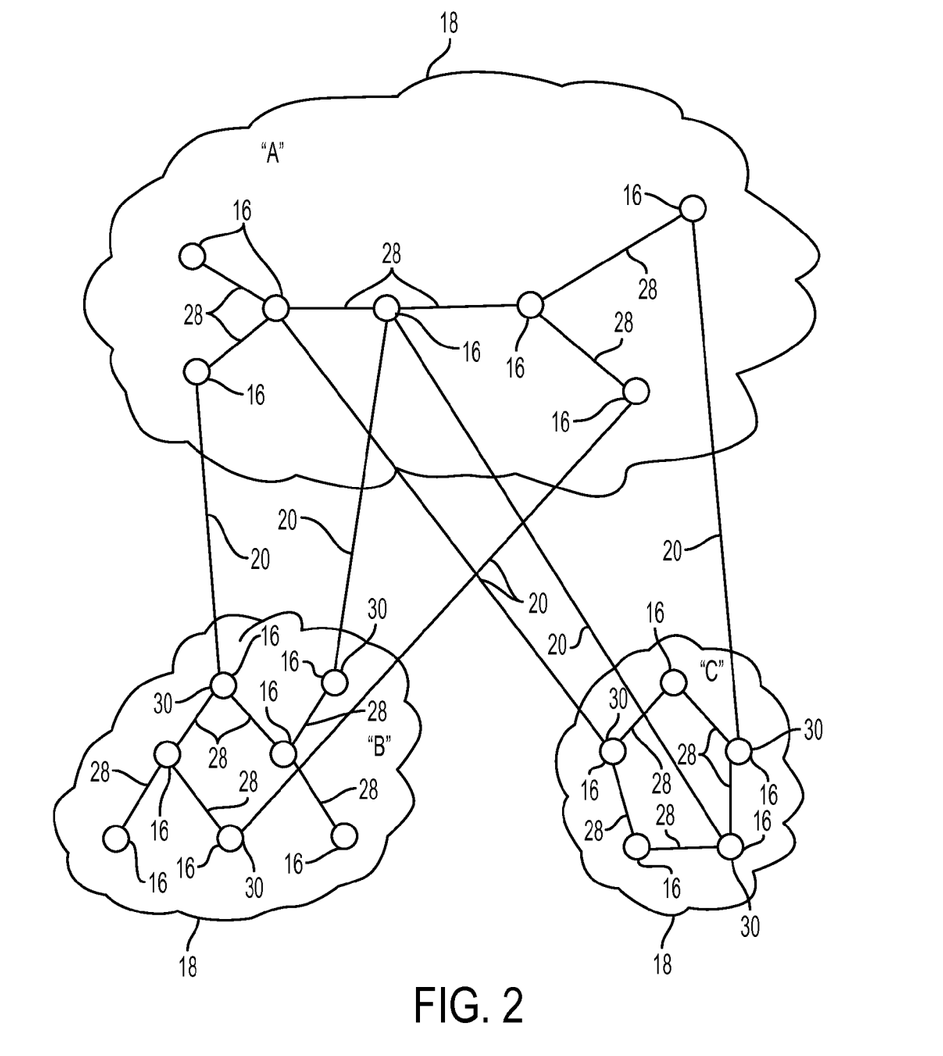
FIG. 2 illustrates in further detail example network devices in a child supernode operating as exit nodes for establishing respective links with a single parent supernode, according to an example embodiment.

FIG. 2 illustrates in further detail the network devices 16 within their associated mini clusters 18. Each mini cluster 18 includes one or more network devices 16. The network devices 16 within a given mini cluster 18 can form their own mini cluster 18 based on data link layer (layer 2) connections, also referred to as intra-cluster data links 28. In one embodiment, each of the network devices 16 within a mini cluster 18 have roughly an equal cost (e.g., a depth of 1 to 2 hops), or an equal rank (computed from physical metric and objective logic) relative to the parent mini cluster.

As illustrated in FIG. 2, each of the mini clusters 18 have their own independent and distinct link layer topologies, for example a ring-based topology for the mini cluster "C" 18; other topologies can include a tree-based topology, a directed acyclic graph-based topology, a mesh topology, a comb topology (comprising a bidirectional routing arc having multiple network devices along the bidirectional routing arc, with one or more unidirectional buttressing arcs that can branch off of the bidirectional routing arc or off of another buttressing arc), etc.

The network devices 16 within a mini cluster 18 in operation 100 negotiate and agree upon a single parent mini cluster (e.g., "A") 18 for forwarding data packets to reach the destination 14. Any network device 16 within a child mini cluster (e.g., "B" or "C") that has at least one inter-cluster data link 20 to the parent mini cluster "A" is identified (either by itself if distributed or by the apparatus 10 if centralized) as an exit node. Hence, each child supernode (e.g., "B") has one or more exit network nodes (i.e. network devices) 30 each providing a corresponding inter-cluster data link 20 to the parent supernode "A" 18. Consequently, each exit network node 30 can have a table entry in its corresponding memory circuit 24 that specifies that any received data packet is destined for the destination device 14 is to be output onto its corresponding inter-cluster data link 20 for transmission to the parent supernode "A" 18.

As described previously, the network devices 16 can establish their own mini cluster 18 using intra-cluster data links 28 that establish a data link layer topology within the corresponding mini cluster 18. Any network device 16 that receives a data packet from outside its mini cluster 18 (and that is not an exit node 30) can identify itself in operation 102 of FIG. 3 as an ingress network node, based on adding to the received data packet an ingress node identifier. The ingress network node in operation 104 can cause the data packet to traverse along any available data link in its corresponding mini cluster (i.e., supernode) 18 in order to enable the data packet to locate one of the exit network devices 30. Since each mini cluster 18 has its own data link layer topology that is independent and distinct from any network layer routing topology established within the computing network, each network device 16 can forward the data packet within the mini cluster 18 until an exit network device 30 receives the data packet.

An exit network device 30 can respond in operation 106 to receipt of the data packet by stripping the ingress node identifier from the data packet, and forwarding the data packet to the parent supernode (e.g., "A") 18 by its corresponding inter-cluster data link 20, for delivery to the destination 14.

According to example embodiments, multiple available links 20 can be established between mini clusters 18 of network devices 16, where the network devices 16 in each mini cluster 18 can negotiate and agree to use the same parent, implemented either as a single network device or a parent cluster. Network layer paths that do not reach the destination 14 via the parent cluster can either be pruned, or ignored entirely based on forwarding the data packet at the data link layer. Hence, a data packet can "walk" through a data link layer topology of a mini cluster 18 until reaching an exit node 30 that can forward the data packet to the parent mini cluster 18 via an inter-cluster data link 20. For example, if a data packet in a tree-based topology reaches a "leaf" end of a tree without reaching an exit node 30, the data packet can be sent back "up" the tree (toward the root, where the root of the tree can be the ingress network node) to find an exit node 30 via another data link path. The "walking" within the cluster bypasses constraints imposed by network layer routing topologies, enabling the data packet to reach the next mini cluster 18 in the hierarchy via any available path 28 in the mini cluster.

Figure 4:
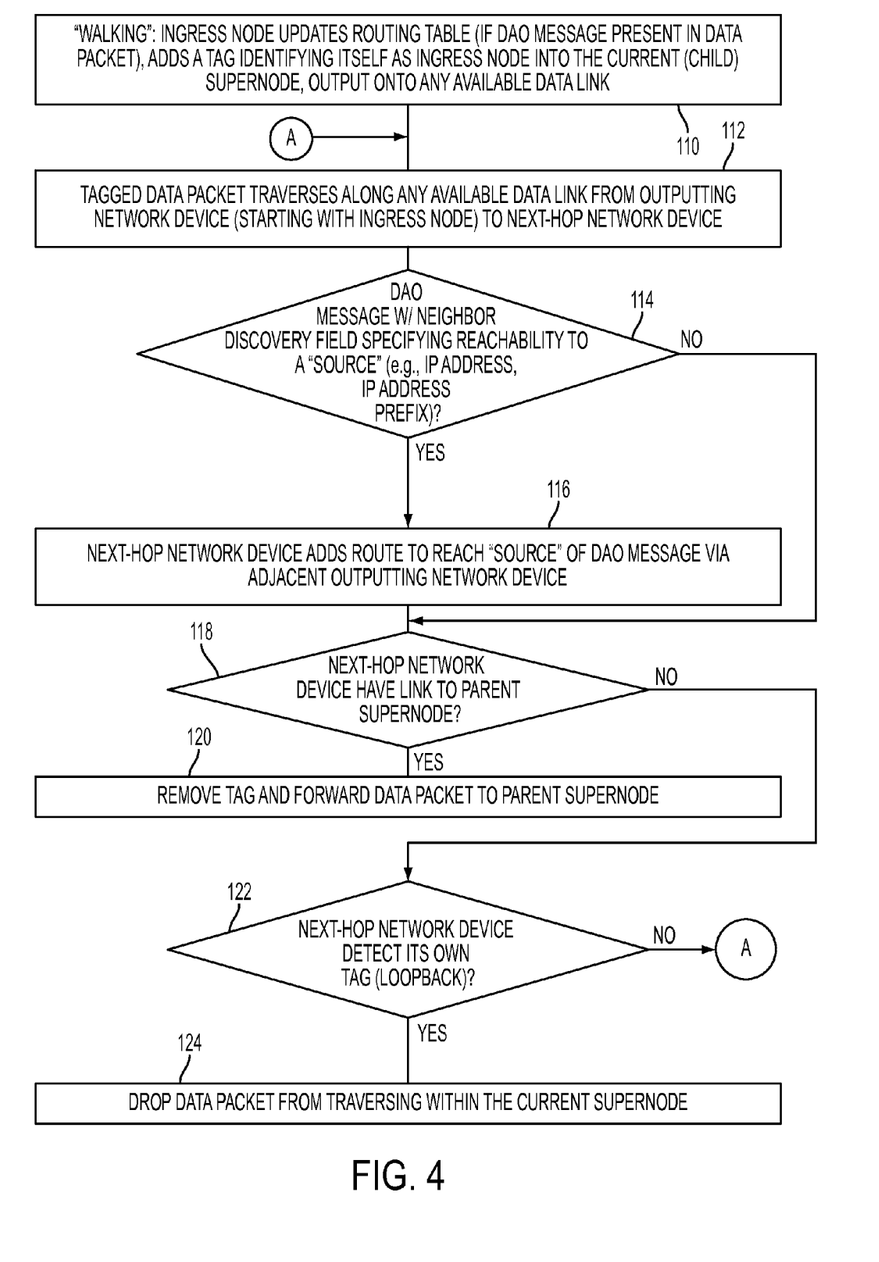
FIG. 4 illustrates an example method of forwarding a data packet upwards from a child supernode toward a parent supernode, according to an example embodiment.

FIG. 4 illustrates an example method of forwarding a data packet upwards from a child supernode toward a parent supernode, according to an example embodiment. In particular, the processor circuit of the apparatus 10 of FIG. 1 (e.g., a centralized network manager) can cause the network devices 16 to perform the operations with respect to FIGS. 3-5, for example based on centralized configuration of the network devices 16; alternately, the apparatus 10 can cause the network devices 16 to execute the disclosed operations in a distributed manner.

Figure 6:
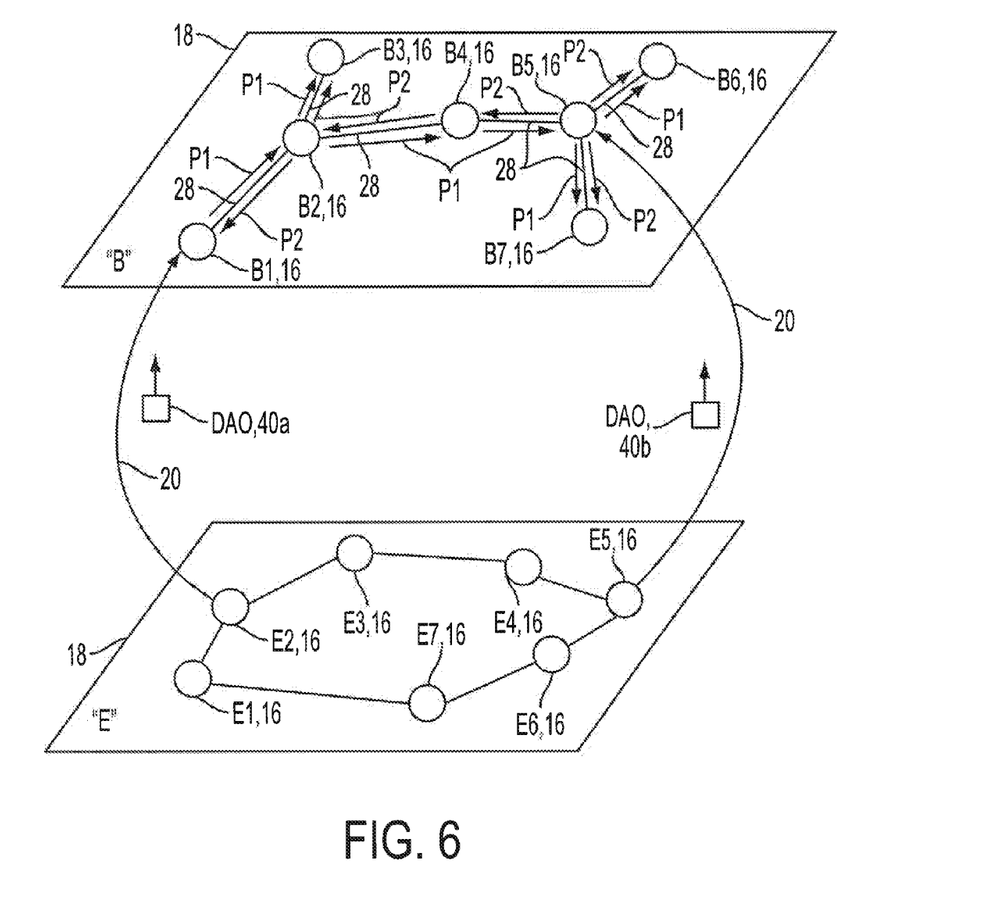
FIG. 6 illustrates establishing multiple routes in a supernode in response to respective neighbor discovery messages from a neighbor discovery source in a child supernode, according to an example embodiment.

Referring to FIGS. 4 and 6, a network device (e.g., "B1" 16 of FIG. 6) can receive in operation 110 a data packet (e.g., 40a of FIG. 6) from outside its supernode "B" 18 from an attached network device (e.g., "E2" 16 of FIG. 6) in a child supernode "E" 18. The attached network device (e.g., "E2" 16 of FIG. 6) can either be an originating source that originated the data packet 40a, or a network device that forwarded the data packet 40 from another network node. In one example embodiment, the received data packet 40 can include a neighbor discovery field specifying reachability to at least an address prefix used by a source (e.g., an IPv6 address prefix "E::/64"), or network address used by a source; for example, the neighbor discovery field can be implemented as a Destination Advertisement Object (DAO) according to RFC 6550; the received data packet 40a also can include reachability information in the form of a neighbor advertisement message as described for example in U.S. Pat. No. 7,428,221. Assuming the received data packet 40a includes reachability information, the ingress node "B1" 16 receiving the data packet 40a from the inter-cluster data link 20 can create in operation 110 a route for reaching the source specified in the reachability information based on creating a route table entry specifying that the source (e.g., "E::/64" used by the child supernode "E" 18) is reachable via the inter-cluster data link 20.

In response to the ingress node "B1" 16 receiving the data packet 40a in operation 110, the ingress node "B1" 16 can add in operation 110 a tag that identifies the network device "B1" 16 as an ingress node into the supernode "B" 18. As described in further detail below, subsequent reception of the data packet 40a containing the tag enables the ingress node "B1" to identify the data packet 40a as having completed "walking" (i.e., traversing) along any and all of the available data links 28 of the supernode "B" 18, to avoid formation of loops. The ingress network node "B1" 16 can output the data packet in operation 110 onto an intra-cluster data link 28 for transmission to a next-hop network device (e.g., "B2") 16.

The tag data packet output by the ingress node "B1" 16 can traverse along any of the available intra-cluster data links 28 in operation 112 until an egress network node to the parent supernode ("A" 18 of FIG. 1) is located. In response to the next-hop network device (e.g., "B2") 16 receiving the data packet, the next-hop network device 16 can determine in operation 114 whether the received data packet includes the above-described neighbor discovery field that specifies reachability to an address prefix or a network address used by a source. If in operation 114 the received data packet includes a neighbor discovery field (e.g., a DAO message), the network device receiving the data packet (e.g., "B2") 16 in operation 116 can create a route for reaching the source by creating a corresponding routing entry for reaching the source (e.g., "E::/64") via the next hop node "B1" (e.g., "E::/64 via B1").

Assuming in operation 118 that the network device "B2" does not have an inter-cluster data link 20 to the parent supernode "A" 18, and since the network device "B2" does not detect its own tag but rather identifies that the ingress network node is the network device "B1" 16, the network device "B2" can forward in operation 112 the tag data packet along its other intra-cluster data links 28 toward its next-hop network devices "B3" and "B4". In particular, the network device "B2" can first forward the data packet 40a to the network device "B3", causing the network device "B3" to update its routing table in operation 116 to specify the source (e.g., "E::/64") is reachable via the next hop node "B2"; assuming the network device "B3" is not an egress node (i.e., an exit network device) having an inter-cluster data link 20 for reaching the parent supernode "A" 18, the network device "B3" in operation 112 forwards the received data packet 40 back to the network device "B2" via the intra-cluster data link 28.

As apparent from the foregoing, the data packet 40a can traverse along all of the available intra-cluster data links 28 until all of the remaining network devices "B4", "B5", "B6" and "B7" have either received and forwarded the data packet, or until an exit network device is located within the supernode "B". As described previously, if the data packet includes reachability information (e.g., a DAO message) each network device receiving the data packet can respond to receiving the data packet during the traverse by creating a corresponding routing entry specifying that the source of the neighbor discovery field (e.g., "E::/64") is reachable via the neighboring network device having forwarded the data packet via the corresponding intra-cluster data link 28. Hence, the creation of the route within the supernode "B" serves as an optimization for forwarding traffic through the supernode "B" 18 toward a destination child supernode "E" 18, without the necessity of implementing any IP-based routing protocols within the supernode "B".

As described previously, if none of the network devices 16 in the supernode "B" 18 can serve as an exit network device (e.g., due to a failed or intermittent inter-cluster data link 20 with the parent supernode "A" 18), the traversal of the data packet can cause the data packet to return back to the ingress network node "B1" 16. In response to the ingress network node "B1" identifying in operation 122 a loopback of the data packet based on the tag specifying that the network device "B1" receiving the data packet also was the ingress network node, the network device "B1" can selectively drop the data packet in operation 124 from the current supernode "B" to prevent loop formation.

Assuming in operation 118 another network device (e.g., "B6") can serve as an exit network device having an inter-cluster data link 20 with the parent supernode "A" 18, the exit network device (e.g., "B6" 16) can remove the tag in operation 120 added by the ingress network node "B1" 16 and forward the data packet to the parent supernode "A" 18 via the inter-cluster data link 20 (see FIG. 1).

Hence, the data packet 40a can traverse along any of the available intra-cluster data links 28 in the child supernode "B" 18 independent of any routing topology established by the network devices, until the data packet reaches an exit network device for the parent supernode "A". Further, reachability information (e.g., a neighbor discovery field) within the data packet can be used by a network device to create a route within the supernode 18 for reaching a source of the reachability information via a neighboring node having forwarded the data packet by a corresponding inter-cluster data link 28, providing an optimization within the supernode "B" 18 for reaching the source of the reachability information without the necessity of implementing an IP-based routing protocol within the supernode 18. A second route in the supernode "B" also can be created as described above with respect to FIG. 4 based on a second data packet 40b being received by another ingress network node (e.g., "B5") 16 and containing reachability information for reaching the same source (e.g., "E::/64"). Hence, the traversal of the first data packet 40a along the paths "P1" in the supernode "B" causes creation of a first route toward the source (e.g., "E::/64") via the network device "B1", and the traversal of the second data packet 40b along the paths "P2" in the supernode "B" causes creation of a second route toward the source (e.g., "E::/64") via the network device "B5" 16. Hence, the network devices 16 in the supernode "B" can reach the source (e.g., "E::/64") via any one of the first route (via network device "B1") or the second route (via network device "B5").

Figure 5:
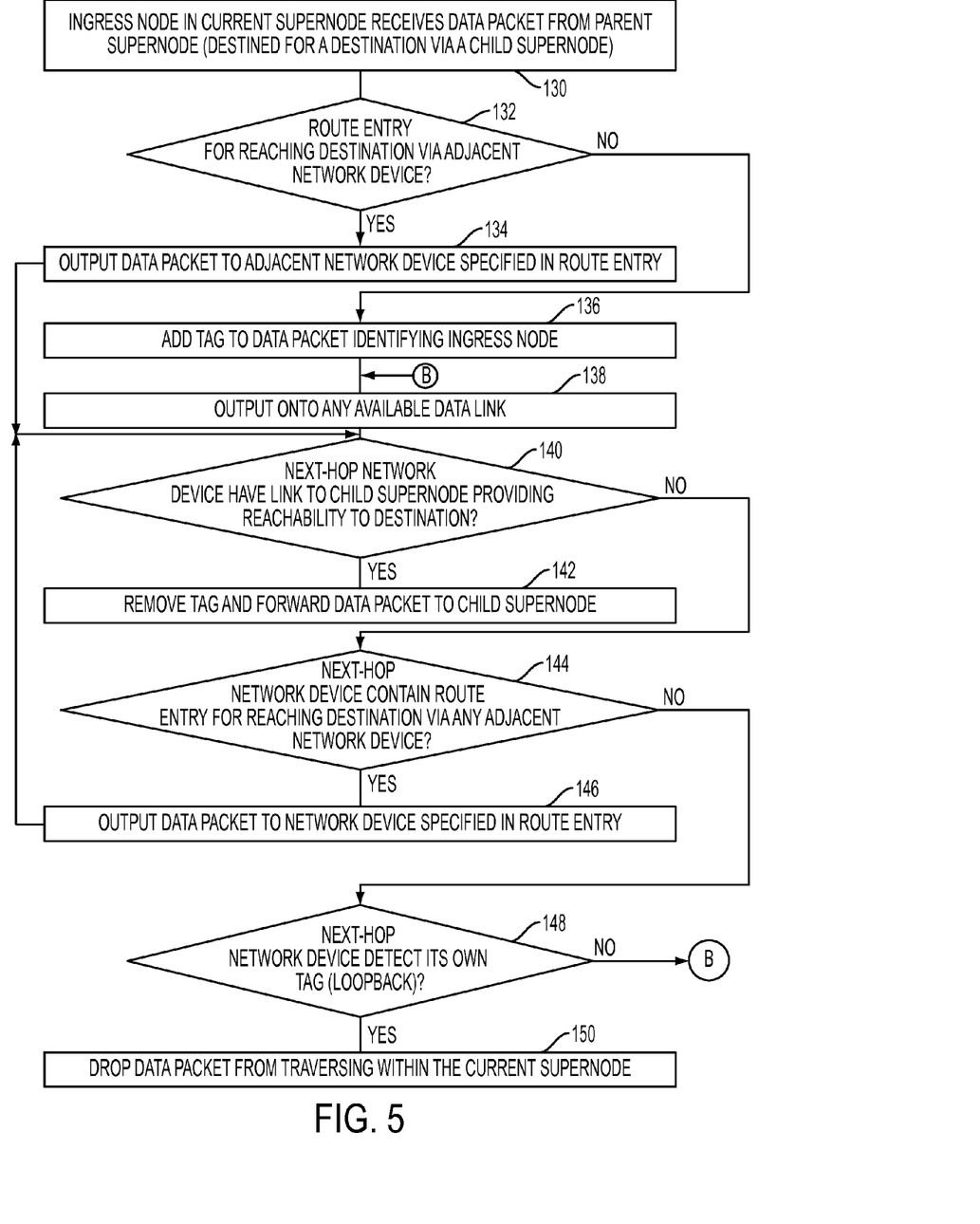
FIG. 5 illustrates an example method of forwarding a data packet downwards from a parent supernode to a destination via a child supernode, according to an example embodiment.

FIG. 5 illustrates an example method of forwarding a data packet downwards from a parent supernode (e.g., "A" 18 of FIG. 1) to a destination (e.g., in child supernode "E" 18) via a child supernode (e.g., "B" 18), according to an example embodiment. Assume the network device "B4" is an ingress network node that has an inter-cluster data link 20 coupling the supernode "B" to the parent supernode "A", and that the ingress network node "B4" receives a data packet from the parent supernode "A" in operation 130. If in operation 132 the ingress network node "B4" has a route entry for reaching the destination (e.g., "E::E7"), the ingress network node "B4" can output the data packet to the adjacent network device specified in the route entry in operation 134.

If in operation 132 the ingress network node "B4" does not have a route entry for reaching the destination, the ingress network node "B4" can add in operation 136 a tag that identifies the network device "B4" as an ingress node into the supernode "B". The ingress network node "B4" 16 can output in operation 138 the data packet for traversal along any available data link in the supernode "B" 18. The next-hop network device in operation 140 can determine if it has an inter-cluster data link 20 to the child supernode "E" providing reachability to the destination of the data packet: if in operation 140 the next-hop network device (e.g., "B5") has an inter-cluster data link 20 to the child supernode "E", the next-hop network device can remove in operation 142 the tag and forward the data packet to the child supernode "E".

If in operation 140 the next-hop network device (e.g., "B2") does not have a link 20 to the child supernode "E" 18, and if in operation 144 the next-hop network device does not have a route entry as described above with respect to FIG. 4, the next-hop network device determines in operation 148 whether it can detect its own tag identifying a loopback of the data packet: if the network device detects its own tag indicating a loopback operation in operation 148, the network device in operation 150 can selectively drop the data packet; if a loopback has not been detected, the network device (e.g. "B4") can output the data packet onto any available data link in operation 138.

Hence, the data packet can traverse along any available data link until the data packet reaches an egress network device (e.g., "B1" or "B5" of FIG. 6) that has an inter-cluster data link 20 to either the destination specified in the data packet (e.g., assuming network device "E2" is the destination), or another child supernode (e.g., "E" 18) providing reachability to the destination (e.g., network device "E7" using the IPv6 address "E::E7").

If the network devices 16 include a route for reaching the destination (as described with respect to FIG. 4), each network device in operations 134 and 146 can output the data packet to a next-hop network device specified in the route entry. Hence, the route entries provide an optimization of traversal of a data packet within the supernode "B", without the necessity of deploying an IP-based routing protocol. For example, assuming the inter-cluster data link 20 was not available for network device "B5" to reach the child supernode "E", a data packet received by the network device "B" (as an ingress node from the parent supernode "A") could need to traverse the path sequence "B4, B5, B6, B5, B7, B5, B4, B2, B3, B2, B1" before exiting the supernode "B" via the egress node "B1"; in contrast, use of the routes could optimize the path to "B4, B5" (based on the DAO 40b having traversed the path "P2"), at which point the network device "B5" would respond to the unavailability of the inter-cluster data link 20 by returning the data packet to "B4". In response, the network device "B4" could use the alternate route (based on the DAO 40a having traversed the path "P1") via the path sequence "B4, B2, B1".

According to example embodiments, the establishment of a hierarchal routing topology utilizing parent supernodes (containing multiple network nodes connected via intra-cluster data links) provides a robust and resilient routing structure. The interconnection of clusters ("supernodes") with multiple inter-cluster data links provides a robust and resilient routing topology that can withstand unreliable or lossy data links, such as found in industrial network applications as described in RFC 5673. Further, the addition of network devices within a cluster can improve resiliency by enabling data packets to traverse along any available data links within the cluster until an egress network node (i.e., exit network device) is located for transmission to the next supernode.

Further, the example embodiments enable a deployment of a robust hierarchal routing topology in an efficient and scalable manner that can be utilized by large scale networks relying on low-power network nodes, for example sensor nodes in sensor networks.

The operations described with respect to any of the FIGS. 1-6 can be implemented as machine executable code stored on a computer or machine readable non-transitory tangible storage medium 24 (e.g., floppy disk, hard disk, ROM, EPROM, EEPROM, nonvolatile RAM, CD-ROM, etc.) that are completed based on execution of the code by the processor circuit 22 implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.) by a machine or device.

Any of the disclosed circuits of the apparatus 10 (including the processor circuit 22, the memory circuit 24, and the device interface circuit 26 (and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 24) causes the integrated circuit(s) implementing the processor circuit 22 to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 24 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a tangible memory medium in the disclosed apparatus (e.g., in a receive buffer). Also note that the memory circuit 24 can be implemented dynamically by the processor circuit 22, for example based on memory address assignment and partitioning executed by the processor circuit 22.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
creating, in a computing network, a hierarchal network layer routing topology for reaching a destination according to a network layer routing protocol, the hierarchal network layer routing topology comprising supernodes including a single parent supernode providing reachability to the destination, and a plurality of child supernodes, each supernode comprising a plurality of network devices interconnected by intra-cluster data links according to a corresponding link layer topology of the corresponding supernode and wherein in each child supernode one or more of the network devices operate as one or more exit network devices each providing the corresponding child supernode a corresponding inter-cluster data link to one of the parent supernode or another child supernode;
receiving, in one of the child supernodes from a distinct one of the child supernodes via the corresponding inter-cluster data link, a data packet for delivery to the destination according to the network layer routing protocol;
causing the data packet to traverse along a sequence of two or more of any distinct available intra-cluster data links in the one child supernode independent of any network layer routing topology established by the network devices in the one child supernode, until the data packet reaches one of the exit network devices;
the one exit network device forwarding the data packet to the parent supernode in response to receipt thereof, via the corresponding inter-cluster data link; and,
the parent supernode delivering the data packet toward the destination, in response to receipt thereof, according to the network layer routing protocol.

2. The method of claim 1, wherein:
the data packet is received by a first network device in the one child supernode;
the causing includes the first network device adding a tag to the data packet that identifies the first network device as an ingress node into the one child supernode, forwarding the data packet along any available intra-cluster data link in the child supernode until the data packet reaches one of the exit network devices, and the first network device selectively dropping the data packet from the one child supernode in response to the first network device identifying a loopback of the data packet based on the tag.

3. The method of claim 1, further comprising:
receiving a second data packet from the single parent supernode by a first network device in a first of the child supernodes, the first network device having an inter-cluster data link coupling the first child supernode to the single parent supernode;
the first network device adding a tag to the second data packet that identifies the first network device as an ingress node into the first child supernode;
the first network device forwarding the second data packet along any available intra-cluster data link in the first child supernode until the second data packet reaches an egress network device in the first child supernode that has an inter-cluster data link to at least one of a second destination specified in the second data packet, or another child supernode providing reachability to the second destination;
the first network device selectively dropping the second data packet from the first child supernode in response to the first network device identifying a loopback of the second data packet based on the tag.

4. The method of claim 1, wherein:
the data packet is received by a first network device in the one child supernode from a source network node in the distinct child supernode and attached to the one child supernode via an inter-cluster data link with the first network device,
the data packet includes a neighbor discovery field specifying reachability to at least one of an address prefix used by a source or a network address used by the source,
the causing includes creating a route in the one child supernode for reaching the source via the first network device based on the network devices in the one child supernode responding to receiving the data packet during the traverse by creating a corresponding routing entry for reaching the source via a neighboring node having forwarded the data packet via a corresponding intra-cluster data link.

5. The method of claim 4, further comprising:
receiving a second data packet from the single parent supernode by an ingress network node in the one child supernode, the ingress network node having an inter-cluster data link coupling the one child supernode to the single parent supernode;
the ingress network node selectively forwarding the data packet along the route established during the traverse based on the second data packet specifying the source of the neighbor discovery field as a destination for the second data packet;
the ingress network node selectively causing the second data packet to perform a second traverse along any of the available intra-cluster data links in the one child supernode until reaching an egress network node in the one child supernode providing an inter-cluster data link to another attached child supernode providing reachability to the destination for the second data packet, based on a determined absence of any route in the one child supernode for reaching the destination for the second data packet.

6. The method of claim 4, further comprising:
receiving a second data packet by a second network device in the one child supernode from a second source network node in the distinct child supernode and attached to the one child supernode via the second network device;
the second data packet including a second neighbor discovery field specifying reachability to the at least one of an address prefix used by the source or the network address used by the source;
causing the second data packet to create a second route in the one child supernode for reaching the source via the second network device based on the network devices in the one child supernode responding to receiving the data packet during a second traverse along any of the available intra-cluster data links, until the second data packet reaches the first network device, enabling the network devices in the one child supernode to reach the source of the second data packet via any one of the route or the second route.

7. The method of claim 1, wherein the hierarchal network layer routing topology is established as a tree topology comprising the single parent supernode as a root of the tree topology.

8. One or more non-transitory machine readable media encoded with logic which when executed by a machine operable for:
  creating, in a computing network, a hierarchal network layer routing topology for reaching a destination according to a network layer routing protocol, the hierarchal network layer routing topology comprising supernodes including a single parent supernode providing reachability to the destination, and a plurality of child supernodes, each supernode comprising a plurality of network devices interconnected by intra-cluster data links according to a corresponding link layer topology of the corresponding supernode and wherein in each child supernode one or more of the network devices operate as one or more exit network devices each providing the corresponding child supernode a corresponding inter-cluster data link to one of the parent supernode or another child supernode;
  causing one of the child supernodes to receive, from a distinct one of the child supernodes via the corresponding inter-cluster data link, a data packet for delivery to the destination according to the network layer routing protocol;
  causing the data packet to traverse along a sequence of two or more of any distinct available intra-cluster data links in the one child supernode independent of any network layer routing topology established by the network devices in the one child supernode, until the data packet reaches one of the exit network devices;
  causing the one exit network device to forward the data packet to the parent supernode in response to receipt thereof, via the corresponding inter-cluster data link; and,
  causing the parent supernode to deliver the data packet toward the destination, in response to receipt thereof, according to the network layer routing protocol.

9. The one or more machine readable media of claim 8, wherein:
  the data packet is received by a first network device in the one child supernode;
  the causing the data packet to traverse includes the first network device adding a tag to the data packet that identifies the first network device as an ingress node into the one child supernode, forwarding the data packet along any available intra-cluster data link in the child supernode until the data packet reaches one of the exit network devices, and the first network device selectively dropping the data packet from the one child supernode in response to the first network device identifying a loopback of the data packet based on the tag.

10. The one or more machine readable media of claim 8, when executed by a machine further operable for:
  causing receiving of a second data packet from the single parent supernode by a first network device in a first of the child supernodes, the first network device having an inter-cluster data link coupling the first child supernode to the single parent supernode;
  causing the first network device to add a tag to the second data packet that identifies the first network device as an ingress node into the first child supernode;
  causing the first network device to forward the second data packet along any available intra-cluster data link in the first child supernode until the second data packet reaches an egress network device in the first child supernode that has an inter-cluster data link to at least one of a second destination specified in the second data packet, or another child supernode providing reachability to the second destination;
  the first network device selectively dropping the second data packet from the first child supernode in response to the first network device identifying a loopback of the second data packet based on the tag.

11. The one or more machine readable media of claim 8, wherein:
  the data packet is received by a first network device in the one child supernode from a source network node in the distinct child supernode and attached to the one child supernode via an inter-cluster data link with the first network device,
  the data packet includes a neighbor discovery field specifying reachability to at least one of an address prefix used by a source or a network address used by the source,
  the causing includes creating a route in the one child supernode for reaching the source via the first network device based on the network devices in the one child supernode responding to receiving the data packet during the traverse by creating a corresponding routing entry for reaching the source via a neighboring node having forwarded the data packet via a corresponding intra-cluster data link.

12. The one or more machine readable media of claim 11, when executed by a machine further operable for:
  receiving a second data packet from the single parent supernode by an ingress network node in the one child supernode, the ingress network node having an inter-cluster data link coupling the one child supernode to the single parent supernode;
  the ingress network node selectively forwarding the data packet along the route established during the traverse based on the second data packet specifying the source of the neighbor discovery field as a destination for the second data packet;
  the ingress network node selectively causing the second data packet to perform a second traverse along any of the available intra-cluster data links in the one child supernode until reaching an egress network node in the one child supernode providing an inter-cluster data link to another attached child supernode providing reachability to the destination for the second data packet, based on a determined absence of any route in the one child supernode for reaching the destination for the second data packet.

13. The one or more machine readable media of claim 11, when executed by a machine further operable for:
  receiving a second data packet by a second network device in the one child supernode from a second source network node in the distinct child supernode and attached to the one child supernode via the second network device;
  the second data packet including a second neighbor discovery field specifying reachability to the at least one of an address prefix used by the source or the network address used by the source;
  causing the second data packet to create a second route in the one child supernode for reaching the source via the second network device based on the network devices in the one child supernode responding to receiving the data packet during a second traverse along any of the available intra-cluster data links, until the second data packet reaches the first network device, enabling the network devices in the one child supernode to reach the source of the second data packet via any one of the route or the second route.

14. The one or more machine readable media of claim 8, wherein the hierarchal network layer routing topology is established as a tree topology comprising the single parent supernode as a root of the tree topology.

15. An apparatus comprising:
a processor circuit configured for creating, in a computing network, a hierarchal network layer routing topology for reaching a destination according to a network layer routing protocol, the hierarchal network layer routing topology comprising supernodes including a single parent supernode providing reachability to the destination, and a plurality of child supernodes, each supernode comprising a plurality of network devices interconnected by intra-cluster data links according to a corresponding link layer topology of the corresponding supernode and wherein in each child supernode one or more of the network devices operate as one or more exit network devices each providing the corresponding child supernode a corresponding inter-cluster data link to one of the parent supernode or another child supernode, the processor circuit further configured for causing a data packet, received in one of the child supernodes from a distinct one of the child supernodes via the corresponding inter-cluster data link and destined for a destination according to the network layer routing protocol, to traverse along a sequence of two or more of any distinct available intra-cluster data links in the one child supernode independent of any network layer routing topology established by the network devices in the one child supernode, until the data packet reaches one of the exit network devices; and
a network interface circuit configured for causing the one exit network device to forward the data packet to the parent supernode in response to receipt thereof, via the corresponding inter-cluster data link, and causing the parent supernode to deliver the data packet toward the destination, in response to receipt thereof, according to the network layer routing protocol.

16. The apparatus of claim 15, wherein:
the data packet is received by a first network device in the one child supernode;
the causing includes the first network device adding a tag to the data packet that identifies the first network device as an ingress node into the one child supernode, forwarding the data packet along any available intra-cluster data link in the child supernode until the data packet reaches one of the exit network devices, and the first network device selectively dropping the data packet from the one child supernode in response to the first network device identifying a loopback of the data packet based on the tag.

17. The apparatus of claim 15, wherein the processor circuit further causes:
receiving a second data packet from the single parent supernode by a first network device in a first of the child supernodes, the first network device having an inter-cluster data link coupling the first child supernode to the single parent supernode;

the first network device adding a tag to the second data packet that identifies the first network device as an ingress node into the first child supernode;
the first network device forwarding the second data packet along any available intra-cluster data link in the first child supernode until the second data packet reaches an egress network device in the first child supernode that has an inter-cluster data link to at least one of a second destination specified in the second data packet, or another child supernode providing reachability to the second destination;
the first network device selectively dropping the second data packet from the first child supernode in response to the first network device identifying a loopback of the second data packet based on the tag.

18. The apparatus of claim 15, wherein:
the data packet is received by a first network device in the one child supernode from a source network node in the distinct child supernode and attached to the one child supernode via an inter-cluster data link with the first network device,
the data packet includes a neighbor discovery field specifying reachability to at least one of an address prefix used by a source or a network address used by the source,
the causing includes creating a route in the one child supernode for reaching the source via the first network device based on the network devices in the one child supernode responding to receiving the data packet during the traverse by creating a corresponding routing entry for reaching the source via a neighboring node having forwarded the data packet via a corresponding intra-cluster data link.

19. The apparatus of claim 18, wherein the processor circuit further causes:
receiving a second data packet from the single parent supernode by an ingress network node in the one child supernode, the ingress network node having an inter-cluster data link coupling the one child supernode to the single parent supernode;
the ingress network node selectively forwarding the data packet along the route established during the traverse based on the second data packet specifying the source of the neighbor discovery field as a destination for the second data packet;
the ingress network node selectively causing the second data packet to perform a second traverse along any of the available intra-cluster data links in the one child supernode until reaching an egress network node in the one child supernode providing an inter-cluster data link to another attached child supernode providing reachability to the destination for the second data packet, based on a determined absence of any route in the one child supernode for reaching the destination for the second data packet.

20. The apparatus of claim 18, wherein the processor circuit further causes:
receiving a second data packet by a second network device in the one child supernode from a second source network node in the distinct child supernode and attached to the one child supernode via the second network device;
the second data packet including a second neighbor discovery field specifying reachability to the at least one of an address prefix used by the source or the network address used by the source;
causing the second data packet to create a second route in the one child supernode for reaching the source via the second network device based on the network devices in the one child supernode responding to receiving the data packet during a second traverse along any of the available intra-cluster data links, until the second data packet reaches the first network device, enabling the network devices in the one child supernode to reach the source of the second data packet via any one of the route or the second route.

* * * * *